(12) United States Patent
Thomas

(10) Patent No.: US 8,144,006 B2
(45) Date of Patent: Mar. 27, 2012

(54) METHODS AND SYSTEMS FOR MESSAGE-ALERT DISPLAY

(75) Inventor: Renjit Tom Thomas, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 258 days.

(21) Appl. No.: 11/533,311

(22) Filed: Sep. 19, 2006

(65) Prior Publication Data

US 2008/0077673 A1 Mar. 27, 2008

(51) Int. Cl.
G08B 1/08 (2006.01)
(52) U.S. Cl. ..................................... 340/539.1; 709/206
(58) Field of Classification Search ............... 340/539.1, 340/506; 709/206; 710/17
See application file for complete search history.

(56) References Cited

U.S. PATENT DOCUMENTS

| | | | |
|---|---|---|---|
| 5,544,321 A | 8/1996 | Theimer et al. | |
| 5,611,050 A * | 3/1997 | Theimer et al. | 709/202 |
| 6,285,407 B1 | 9/2001 | Yasuki et al. | |
| 7,061,399 B2 * | 6/2006 | Leck | 340/870.06 |
| 7,162,451 B2 | 1/2007 | Berger et al. | |
| 7,289,788 B2 | 10/2007 | Shan | |
| 7,640,341 B2 | 12/2009 | Regan | |
| 2001/0053274 A1 | 12/2001 | Roelofs et al. | |
| 2003/0001846 A1 | 1/2003 | Davis et al. | |
| 2003/0040334 A1 | 2/2003 | Lee | |
| 2003/0070177 A1 | 4/2003 | Kondo et al. | |
| 2003/0078966 A1 | 4/2003 | Kinjo | |
| 2003/0095540 A1 | 5/2003 | Mulligan et al. | |
| 2003/0146854 A1 | 8/2003 | Jones et al. | |
| 2003/0169151 A1 * | 9/2003 | Ebling et al. | 340/7.58 |
| 2003/0232593 A1 | 12/2003 | Wahlroos et al. | |
| 2004/0133597 A1 | 7/2004 | Fano et al. | |
| 2004/0249962 A1 | 12/2004 | Lecomte | |
| 2004/0259537 A1 | 12/2004 | Ackley | |
| 2005/0165918 A1 | 7/2005 | Wantanabe et al. | |
| 2005/0195274 A1 | 9/2005 | AbiEzzi et al. | |
| 2005/0226264 A1 | 10/2005 | Toyoda | |
| 2006/0001737 A1 | 1/2006 | Dawson et al. | |
| 2006/0053468 A1 | 3/2006 | Sudoh et al. | |

(Continued)

FOREIGN PATENT DOCUMENTS

JP 2001-257709 A 9/2001

(Continued)

OTHER PUBLICATIONS

Partial European Search Report for Application No. 07018227.4-2413.

(Continued)

*Primary Examiner* — John A Tweel, Jr.
(74) *Attorney, Agent, or Firm* — Kristine Elizabeth Matthews; David C. Ripma

(57) ABSTRACT

With a growing number of personal and shared devices that may be connected to the Internet, the number of devices on which a person may receive a message increases. Privacy in message delivery may become an issue when a message may be received on a shared device, for example, a television. Aspects of the present invention relate to systems and methods for displaying message alerts on shared and private devices according to user preferences.

20 Claims, 4 Drawing Sheets

U.S. PATENT DOCUMENTS

| | | |
|---|---|---|
| 2007/0028279 A1 | 2/2007 | Kim |
| 2008/0024593 A1 | 1/2008 | Tsirinsky et al. |
| 2008/0034435 A1* | 2/2008 | Grabarnik et al. .............. 726/25 |
| 2008/0052150 A1 | 2/2008 | Grouf et al. |
| 2008/0072261 A1 | 3/2008 | Ralston et al. |

FOREIGN PATENT DOCUMENTS

| | | |
|---|---|---|
| JP | 2003-316697 A | 11/2003 |
| WO | WO03077550 | 9/2003 |
| WO | 2006070067 A1 | 7/2006 |
| WO | WO 2006070067 | 7/2006 |

OTHER PUBLICATIONS

U.S. Appl. No. 11/533,303—Office action dated Jun. 29, 2009.
U.S. Appl. No. 11/533,303—Office action dated Jan. 28, 2010.
Application No. EP 07 01 8227—European Search Report—Date of completion of the search Jun. 26, 2009.
U.S. Appl. No. 11/533,303—Office action dated Aug. 2, 2010.
Japanese Patent Application No. 2007-240138—Office Action—Mailing Date Mar. 2, 2010.
U.S. Appl. No. 11/533,303—USPTO Notice of Allowance dated Mar. 22, 2011.

* cited by examiner

METHODS AND SYSTEMS FOR MESSAGE-ALERT DISPLAY

FIELD OF THE INVENTION

Embodiments of the present invention comprise methods and systems for displaying message alerts on shared and private devices.

BACKGROUND

With growing numbers of both personal and shared devices that may be connected to the Internet, the number of devices on which a person may receive a message increases. Privacy in message delivery becomes an issue when messages may be received on shared devices, such as a television.

SUMMARY

Some embodiments of the present invention comprise methods and systems for displaying message alerts on shared and private devices according to user preferences entered at the message server.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

A growing number of devices may provide connection to the Internet. These devices may include both shared devices, also considered public devices, such as a television, and private devices, for example, a personal computer, a personal digital assistant, a personal digital music player, and a cell phone. A shared, or public device, may be used simultaneously by several people. Further, increased Internet-protocol-based (IP-based) services are being deployed on cell phones; while home devices, like televisions, may be connected to the Internet via numerous methods including Ethernet, wireless connection, and cable. Developments such as these may open up a wide range of new services and applications that link various devices. An example of one application is transmission of multi-media messages and live message streams to, and from, any of these devices. A message, also referred to as mail, may be an electronic mail message (email), a multi-media message (MMS), a video mail, a voice mail, or any other communication of media content, including those comprising live media streams of either voice or video or both. The terms message and mail will be used interchangeably throughout this specification and the associated claims. Additionally, the term server and mail server will be interchangeably. Embodiments of the present invention comprise methods and systems for displaying message alerts on public and private devices according to user preferences entered at the message server.

Mail may be delivered to a personal device (or several personal devices) on which a user may log in to and then subsequently, the user may sign in to a mail service from which he may access his mail. A user may also log on to his mail service from a shared device. After logging in with his password to the mail service, the user may then view private messages addressed to him.

Figure 1:
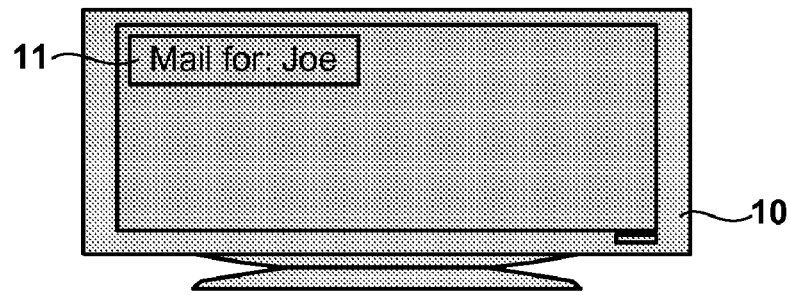
FIG. 1 is a drawing depicting an unobtrusive message alert on an exemplary shared device.

In some embodiments of the present invention, an alert may be presented on a shared device indicating that a mail message for a member in the community of the shared device has been received. The alert 11 may be presented in an unobtrusive manner as shown in FIG. 1 for an exemplary shared device 10. In some embodiments of the present invention, if no member in the community of the shared device is logged in, the exemplary alert 11 may indicate only the name of the recipient of the message.

Figure 2:
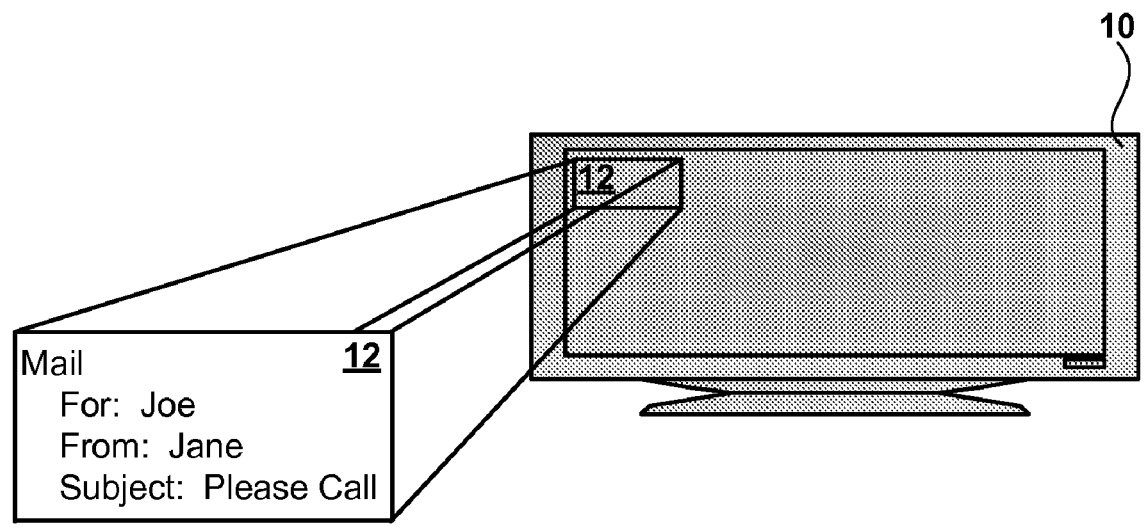
FIG. 2 is a drawing depicting an unobtrusive message alert on an exemplary shared device according to embodiments of the present invention when a user may be logged into the shared device.

In some embodiments of the present invention, if a member of the community of the shared device has logged in to the device, the alert may indicate additional information. FIG. 2 shows an exemplary alert for a user that is logged in to an exemplary shared device 10. The alert 12 may indicate the name of the recipient of the message and additional information, for example, the name of the sender of the message, and the subject of the message.

Figure 3:
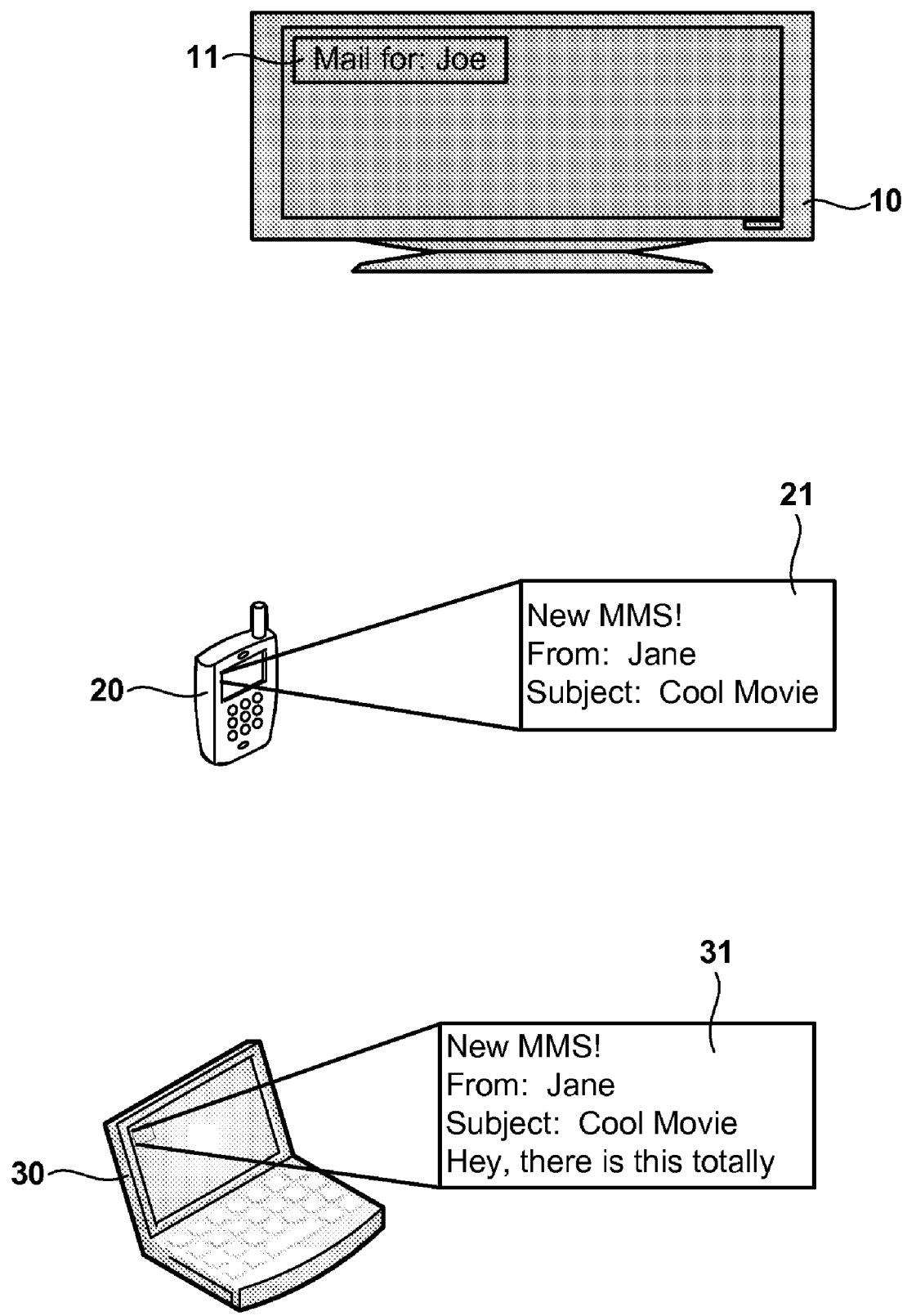
FIG. 3 is a drawing depicting different alerting levels for different device types according to embodiments of the present invention.

In some embodiments of the present invention, as shown in FIG. 3, a user may have multiple devices active at the same time, and he may be alerted to the receipt of a message on all of his devices in a different manner based on the device type. On a shared device, for example a television, 10, the message alert 11 may comprise minimal information, for example the name of the message recipient. On a private device with a small or limited display, for example a cell phone, 20, the message alert 21 may comprise additional, but still limited, information, for example the message subject and the name of the sender. On a private device with a larger display, for example a personal computer, 30, the message alert 31 may comprise further additional information, for example the first line of text of a text message. These examples are intended to illustrate different alerts on different devices and should not be construed as limitations of the type or nature of the alerts. In some embodiments of the present invention, in addition to the type of message information contained in an alert, the presentation style and appearance of the alert may be device dependent.

Figure 4:
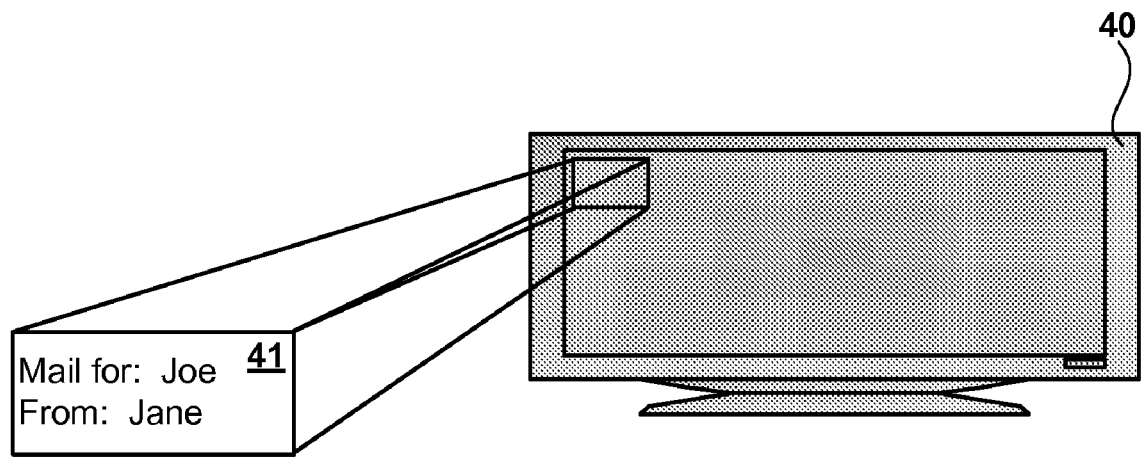
FIG. 4 is a drawing depicting a message alert on an exemplary public device according to embodiments of the present invention wherein said alert may be based on user preferences defined at a server.

In some embodiments of the present invention, a user may set their alert display preferences at the mail server. The display preferences may be specified by Extensible Markup Language (XML) code or any other encoding of the preferences that may be compiled and executed, interpreted or otherwise stored, read, and executed at the mail server. In some embodiments, the preferences may be stored at the mail server per user account. Exemplary XML code indicating a preference that any information may be passed in an alert to a private device and only the "from" field may be shown in an alert at a public device may be given by:

```
<display>
    <public>
        <alert>
            <field>
                from
            </field>
        </alert>
    </public>
    <private>
        <alert>
            <field>
                all
            </field>
        </alert>
    </private>
</display>
``` and FIG. 4 depicts an exemplary presentation of an alert 41 on a public device 40 according to this preference.

Exemplary XML code indicating a preference that any information may be passed in an alert to a private device and only an alert as to receipt of a message may be shown in an alert at a public device may be given by:

```
<display>
    <public>
        <alert>
        </alert>
    </public>
    <private>
        <alert>
            <field>
                from
            </field>
        </alert>
    </private>
</display>
``` which may result in an exemplary alert as shown in FIG. 1.

In some embodiments of the present invention, the display of message alerts may be based on rules defined at the mail server by the user. A user may define rules for alert content and display based on the device on which the alert may be displayed. The user may also define rules for alert content and display based on message properties. The user may also define rules for alert content and display based on message content. The user may define rules based on a combination of the above elements. An exemplary rule may be that if a message is explicitly sent to all members in the community of a shared device, then the subject field and the from field may be shown in alerts on public devices. Exemplary XML code specifying this rule may be given by:

```
<rule>
    <condition>
        <logic_or>
            <cc/>
            <to/>
        </logic_or>
        <includes>
            <logic_and>
                <email>
                    father@yahoo
                </email>
                <email>
                    mother@yahoo
                </email>
                <email>
                    Kid1@yahoo
                </email>
                <email>
                    Kid2@yahoo
                </email>
            <logic_and>
        </includes>
    </condition>
    <action>
        <display>
            <public>
                <alert>
                    <field>
                        All
                    </field>
                </alert>
            </public>
        </display>
    </action>
``` which indicates that if a message arrives with all four family email addresses in either the "cc" field or the "to" field, then the alert may contain any field without restriction. In some embodiments, when a message is received by all the members of the community of the shared device, then only one alert may be displayed on the shared device. Each individual member may receive an alert corresponding to the message on their individual private devices. In some embodiments of the present invention, the community of the shared device may have a group alias for which preference rules may be defined.

In some embodiments of the present invention, the preferences may be set at the mail server, and the public or private client may only access the preferred fields for alerting the user. If the user explicitly logs in to the mail server, then there may be no restriction to the information retrieved by the client.

In some embodiments of the present invention, the rules and preferences defined at the mail server may control the data transferred to the client, and the client may control the display appearance.

In some embodiments of the present invention, a user may receive message alerts only when explicitly logged in to a shared device. The shared device may be properly authenticated with the specific user account login.

In alternate embodiments of the present invention, a shared device may store the mail server password of each member of the community of the shared device. The shared device may store the passwords encrypted using the device's public key, and when the device boots up it may retrieve the stored passwords.

In alternate embodiments of the present invention, a device password may be associated with a shared device, one time. Then each member of the community of the shared device may then associate the shared-device password with their personal account at the server. The association may be done using a private device or public device. The server may maintain a table of members who desire alerts on the shared device.

When the shared device boots up, the shared device may authenticate to the server using standard challenge-response mechanisms, for example the authentication framework Simple Authentication and Security Layer (SASL), with the device password. The shared device may then poll or listen for new mail alerts for members who have registered the device password at the server.

In some embodiments, the shared device may have certificates associated with it. The device may be manufactured with device certificates, with root authority from the manufacturer, which may be certified by a certificate authority, for example VeriSign. Each public device may have a public-private key pair. During a one time set up, a user may associate his account with the device certificate. In embodiments using certificate association, an alert may be encrypted with a key derived from the public key. When the shared device boots up, it may send the certificate to the mail server. The mail server may verify the certificate, and the mail server may notify the alerts for all registered users of the shared device.

Figure 5:
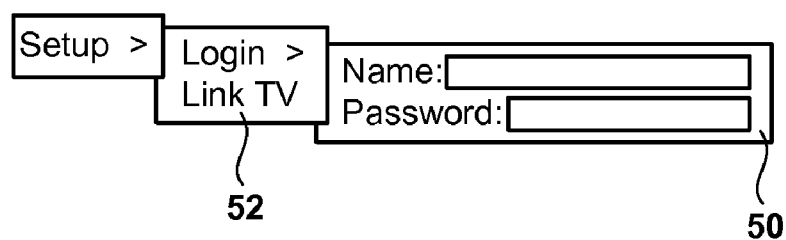
FIG. 5 is a drawing depicting an exemplary user interface for associating a device certificate with a user account.

An exemplary user interface (UI) for associating the shared device certificate with a user's mail account may be shown in FIG. 5. The user may first indicate his login name and password using the interface 50, and he may then link 52 the shared device, in this example a television, using the "Link TV" option to the mail account on the mail server. The shared device may then send a message to the mail server requesting association of the user account password with the shared device certificate. An exemplary initiation message may be as shown below using WSDL-SOAP-XML-HTTP:

```
<?xml version="1.0" encoding="utf-8" ?>
<S:Envelope xmlns:S="http://schemas.xmlsoap.org/soap/envelope/"
    xmlns:sb="urn:liberty:sb:2003-08"
    xmlns:sa="urn:liberty:sa:2004-04" >
<S:Header>
    <sb:Correlation S:mustUnderstand="1"
    messageID="uuid:0023923-28329023-238239023"
    timestamp="2004-06-17T23:55:01Z" />
</S:Header>
<S:Body>
    <registerdevicecert>
        <username>  dad </username>
        <serialnumber> 0198373 </serialnumber>
        <type> TV </type>
        <cert> ashadsahdhdlsajsaldslalkuuiwyuy== </cert>
    </registerdevicecert>
</S:Body>
</S:Envelope>
```
however, other messaging and posting methods may be used.

In alternate embodiments of the present invention, a member of the community associated with a shared device may log in to the device for a one time set up session using his device account password. The member may then select a secondary password for media sharing. The member may then log in to the mail server and may enter the secondary password for media sharing. The shared device and the mail server may then know the set of sharing passwords for each member. The secondary password may be used to log into the server using standard challenge-response mechanisms at the time of shared-device boot up, and the shared device may then receive alerts for the registered members.

In some embodiments of the present invention, when each device, private or public, logs in, the mail server may maintain the presence of each user and device. When a shared device logs in with a device password and a set of secondary passwords, the server may mark the limited presence of the registered users associated with the shared device. When an explicit log in to a shared device is made by a member of the community associated with the shared device, the mail server may update the presence of the member to indicate explicit log in, and in some embodiments, this may change the level of alerts that may be received on the shared device for that member.

Figure 6:
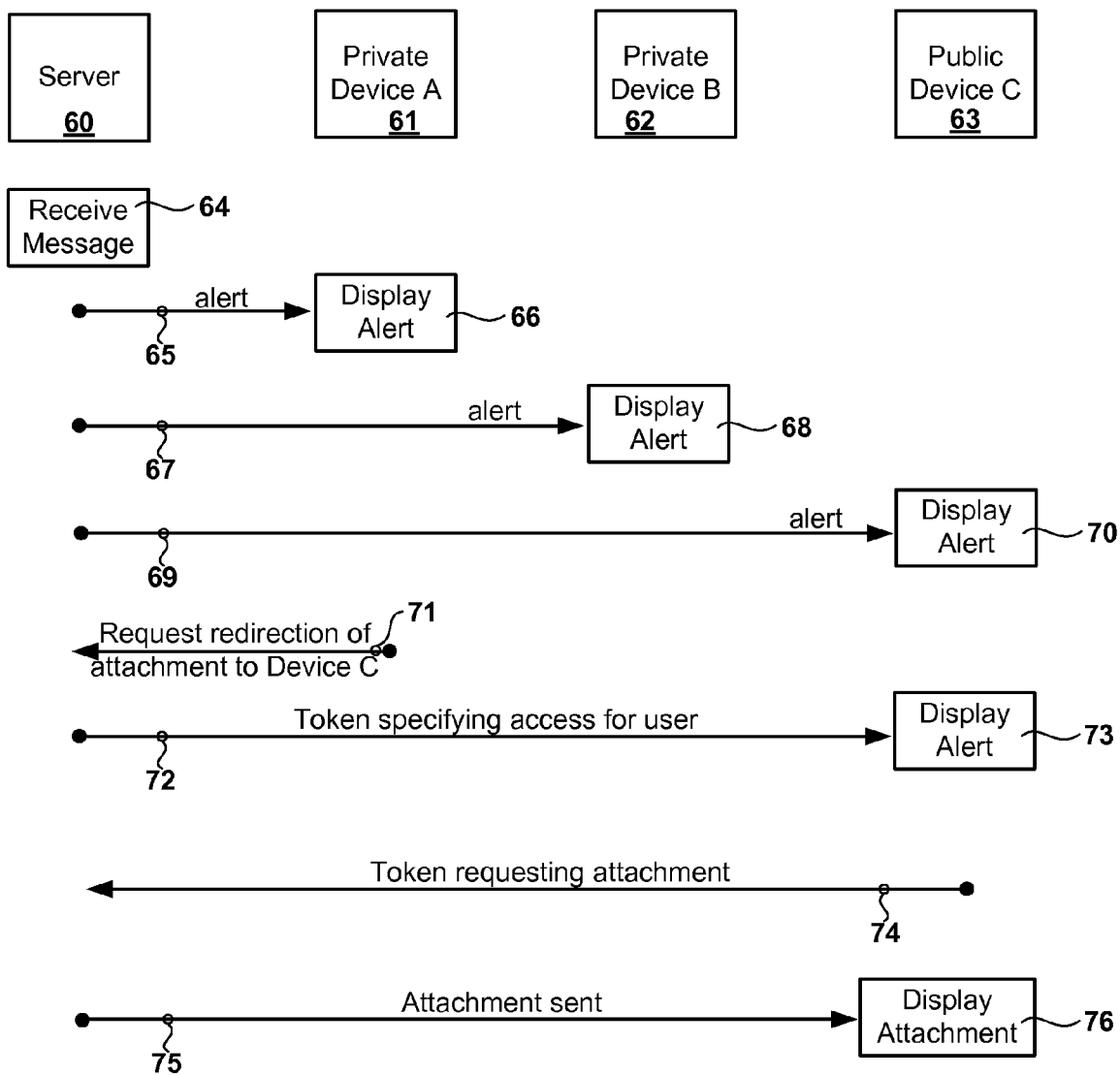
FIG. 6 is a drawing depicting embodiments of the present invention in which a message attachment may be redirected to an alternate device.

In exemplary embodiments of the present invention shown in FIG. 6, a message for an intended recipient may be received 64 on the server 60. The server 60 may alert 65, 67, 69 the multiple devices 61, 62, 63 registered for the intended recipient. In the example shown in FIG. 6, the intended recipient may be registered on two private devices, private device A 61 and private device B 62, in addition to one public device, public device C 63. The server 60 may alert 65, 67, 69 each device 61, 62, 63 according to the preferences stored at the server 60 for the intended recipient. Each device 61, 62, 63 may display its respective alert 66, 68, 70 according to its device display rules. The user may examine the message 64 through any of the devices 61, 62, 63, for example, through private device A 61. The user may desire redirection of a portion of the message to public device C 63. In an exemplary scenario, a user may receive a mail comprising an image attachment on his cell phone, The user may request the server to redirect the image attachment to the television to enable more suitable viewing conditions. The user's request may be transmitted 71 from private device A 61 to the server 60.

The server 60 may send a token to the television with access being indicated for the user and a timeout restriction 72 to the public device C 63. In alternate embodiments there may be no timeout restriction. An application on the public device C 63 may receive the token, and display an alert 73. The user may then select the alert 73. The application on the public device C 63 may make a request 74 to the server 60 with the same token, and the server 60 may send the attachment 75 to the public device C 63. The public device C 63 may then display the attachment 76. An exemplary token may be given by:

```
GUID: 21783647as23av
Message ID: 2gh2s76az
InviteSource: 3608288350
DestinationName: TV
DestinationID: 01923338561
TimeStamp: 21:30:23T8:11:2006
TimeOut: 10:00
Signature: 23hsg15667uys2==
``` where the entry in the "GUID" field may indicate the token identification, the entry in the "Message ID" field may be the message identification, and the entry in the "Signature" field may be the signature inserted by the server. When the server 60 sends the attachment 75 to the public device C 63, the server 60 may encrypt the attachment using the secondary password associated with the user. The public device C 63 may decrypt the content by retrieving the secondary password associated with the user and may then display the content.

In some embodiments of the present invention, a message may be received on multiple devices. The user may direct a portion of a message to any one of the devices from any of another of the devices. Embodiments of the present invention as discussed relative to FIG. 6 are not limited to three devices, or limited to a redirection request from a private device for redirection to a public device.

In embodiments of the present invention in which the passwords may be used to authenticate a shared device with the server, a challenge-response method may be used.

In alternate embodiments of the present invention in which a certificate may be used to authenticate a shared device with the server, the signature may be verified up to a root authority level. The manufacturer of the shared device may obtain a certificate for the shared device assembly, and may issue secondary certificates to each device manufactured. Each manufactured shared device may have a unique certificate, also considered public key, and each certificate may be signed by the manufacturer, who in turn may be certified by VeriSign. When a shared device present the certificate to a server, the certificate authentication may go all the way to the standard root authority.

After authentication by the standard root authority, the server may issue a token which has all the information regarding the shared device. An exemplary token may be:

```
GUID: 21783647as23av
DeviceName: TV
DevieType: Public
User: Dad
DeviceID: 01923338561
TimeStamp: 21:30:23T8:11:2006
ValidityPeriod: 24:00:00
Signature: 23hsg15667uys2==
``` in which the entry in the "GUID" field may indicate the identification of the token, the entry in the "User" field may indicate the token for a particular member, the entry in the "DeviceID" field may indicate the product serial number, and the entry in the "Signature" field may indicate the signature of the server. The shared device may include the token in all subsequent message queries to the server.

The server response to a query from a device may depend on the device. It may depend on if the device is a public device or a private device. An exemplary response to a query from a public device may be:

```
<GetNewMailReponse>
    <Alerts>
        <Alert>
            <Id> 1</Id>
            <From>
                <Name> Buddy1 </Name>
                <Id> buddy1@yahoo </Id>
            </From>
        </Alert>
        <Alert>
            <Id> 2</Id>
            <From>
                <Name> Buddy2 </Name>
                <Id> buddy2@yahoo </Id>
            </From>
        </Alert>
``` and a response to the same query from a private device may be:

```
<GetNewMailReponse>
    <Alerts>
        <Alert>
            <Id> 1</Id>
            <From>
                <Name> Buddy1 </Name>
                <Id> buddy1@yahoo </Id>
            </From>
            <Subject>
                Cool Movie in Town
            </Subject>
        </Alert>
        <Alert>
            <Id> 2</Id>
            <From>
                <Name> Buddy2 </Name>
                <Id> buddy2@yahoo </Id>
            </From>
            <Subject>
                Party at buddy3's house!
            </Subject>
        </Alert>
``` based on which additional information may be displayed at the private device, in contrast to that information which may be display at the public device.

In some embodiments of the present invention, a message may be encrypted using either the device password or the public key. In some embodiments of the present invention, an alert may be encrypted using either the device password or the public key.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:
1. A method for generating and displaying a message alert, said method comprising:
    storing, on a resource accessible to a server, an alert preference for a subscriber, wherein said alert preference comprises a first alert description for a first device and a second alert description for a second device, wherein said first alert description is related to whether said first device is a private device or a shared device, and when said first device is a private device, said first alert description is further related to the size of a display on said first device, and said second alert description is related to whether said second device is a private device or a shared device, and when said second device is a private device, said second alert description is further related to the size of a display on said second device, wherein a shared device is a device with a device property that said shared device may be used simultaneously by several people and a private device is a device with a device property that said private device may not be used simultaneously by several people;
    receiving a message for said subscriber at said server;
    if said first device is detected as present by said server:
        generating, according to said first alert description, a first message alert associated with said message; and
        sending said first message alert for said subscriber to said first device; and if said second device is detected as present by said server:
  generating, according to said second alert description, a second message alert associated with said message; and
  sending said second message alert for said subscriber to said second device.

2. The method as described in claim 1, wherein said first device is a shared device and said second device is a private device.

3. The method as described in claim 2, wherein the content of said first message alert is a subset of the content of said second message alert.

4. The method as described in claim 1, wherein at least one of said first message alert and said second message alert are encrypted using a password associated with said subscriber.

5. The method as described in claim 1, wherein said first device is a shared device.

6. The method as described in claim 5, wherein said shared device is a television.

7. The method as described in claim 1, wherein said first device is a private device.

8. The method as described in claim 7 wherein, said private device is a device selected from the group consisting of a cell phone, a personal digital assistant (PDA), a personal computer, and a personal digital music player.

9. A method for generating and displaying a message alert, said method comprising:
  storing, on a resource accessible to a server, an alert preference for a subscriber, wherein said alert preference comprises an alert description for a device, wherein alert description is related to whether said device is a private device or a shared device, and when said device is a private device, said alert description is further related to the size of a display on said device, wherein a shared device is a device with a device property that said shared device may be used simultaneously by several people and a private device is a device with a device property that said private device may not be used simultaneously by several people;
  receiving a message for said subscriber at said server;
  if said device is detected as present by said server and said subscriber is explicitly logged in to said device:
    generating a first message alert according to said alert description; and
    sending said first message alert for said subscriber to said device; and
  if said device is detected as present by said server and said subscriber is not explicitly logged in to said device:
    generating a second message alert; and
    sending said second message alert for said subscriber to said shared device.

10. The method as described in claim 9, further comprising encrypting at least one of said first message alert and said second message alert using a device password associated with said shared device.

11. The method as described in claim 9, further comprising encrypting at least one of said first message alert and said second message alert using a secondary password associated with said subscriber.

12. The method as described in claim 9, wherein said device is a television.

13. The method as described in claim 9, wherein the content of said second message alert is a subset of the content of said first message alert.

14. A system for generating and displaying a message alert, said system comprising:
  storage, accessible to a server, for storing an alert preference for a subscriber, wherein said alert preference comprises a first alert description for a first device and a second alert description for a second device, wherein said first alert description is related to whether said first device is a private device or a shared device, and when said first device is a private device, said first alert description is further related to the size of a display on said first device, and said second alert description is related to whether said second device is a private device or a shared device, and when said second device is a private device, said second alert description is further related to the size of a display on said second device, wherein a shared device is a device with a device property that said shared device may be used simultaneously by several people and a private device is a device with a device property that said private device may not be used simultaneously by several people;
  a receiver for receiving a message for said subscriber at said server;
  a message generator for:
  generating a first message alert according to said first alert description when said first device is detected as present; and
  generating a second message alert according to said second alert description when said second device is detected as present; and
  a transmitter for sending said first message alert for said subscriber to said first device if said first device is detected as present to said server and for sending said second message alert for said subscriber to said second device if said second device is detected as present to said server.

15. The system as described in claim 14, wherein said first device is a shared device and said second device is a private device.

16. The system as described in claim 15, wherein the content of said first message alert is a subset of the content of said second message alert.

17. The system as described in claim 14, wherein said first device is a shared device.

18. The system as described in claim 17, wherein said shared device is a television.

19. The system as described in claim 14, wherein said first device is a private device.

20. The system as described in claim 19, wherein said private device is a device selected from the group consisting of a cell phone, a personal digital assistant (PDA), a personal computer, and a personal digital music player.

* * * * *